United States Patent

Yarborough et al.

[11] 3,934,210
[45] *Jan. 20, 1976

[54] TUNING APPARATUS FOR AN OPTICAL OSCILLATOR

[75] Inventors: J. Michael Yarborough, Tuscon, Ariz.; James L. Hobart, Los Altos Hills, Calif.

[73] Assignee: Coherent Radiation, Palo Alto, Calif.

[ * ] Notice: The portion of the term of this patent subsequent to Feb. 25, 1992, has been disclaimed.

[22] Filed: May 30, 1974
(Under Rule 47)

[21] Appl. No.: 474,305

Related U.S. Application Data

[63] Continuation-in-part of Ser. No. 365,317, May 30, 1973, Pat. No. 3,868,592.

[52] U.S. Cl. ........ 331/94.5 C; 331/94.5 M; 350/157
[51] Int. Cl.² ............................................. H01S 3/10
[58] Field of Search ........... 331/94.5; 350/157, 159, 350/311, 316

[56] References Cited
UNITED STATES PATENTS

| | | | |
|---|---|---|---|
| 3,358,243 | 12/1967 | Collins, Jr. et al. | 331/94.5 |
| 3,422,370 | 1/1969 | Collins, Jr. | 331/94.5 |
| 3,588,224 | 6/1971 | Pritchard | 331/94.5 |
| 3,628,173 | 12/1971 | Danielmeyer | 331/94.5 |

*Primary Examiner*—William L. Sikes
*Attorney, Agent, or Firm*—Limbach, Limbach & Sutton

[57] ABSTRACT

One or more birefringent plates are placed within the optical cavity of an optical oscillator such as a dye laser. Each of the plates is positioned at an angle, such as Brewster's angle with respect to the light reflected within the optical cavity of the optical resonator. The output wavelength from the optical resonator is tuned, or its bandwidth narrowed, by rotating the birefringent plates while maintaining the plates at the same angle.

6 Claims, 10 Drawing Figures

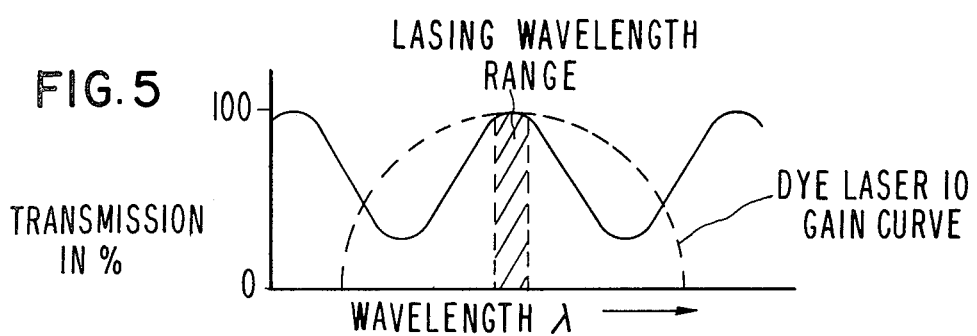
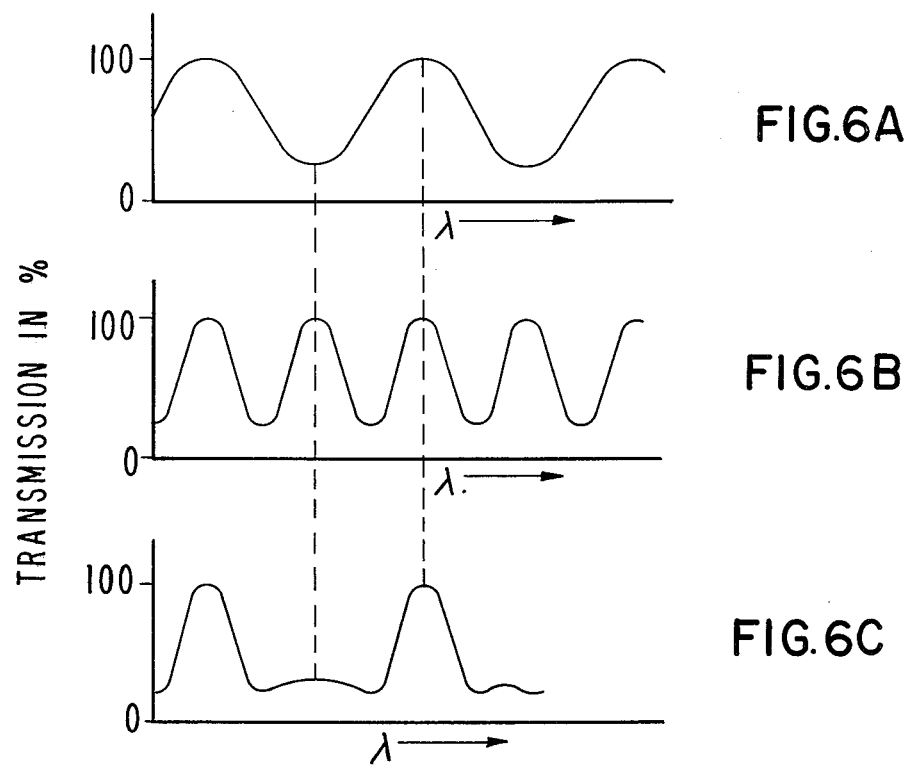
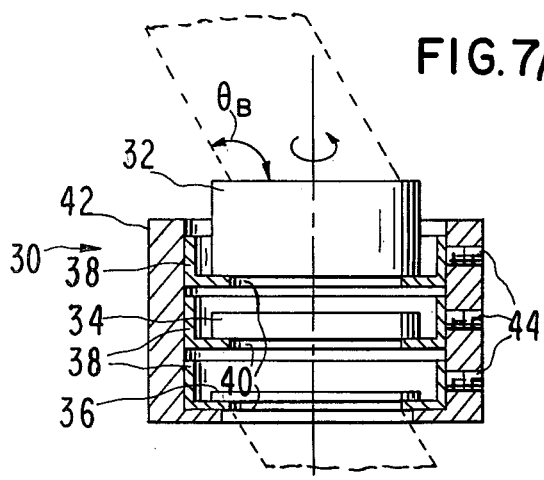
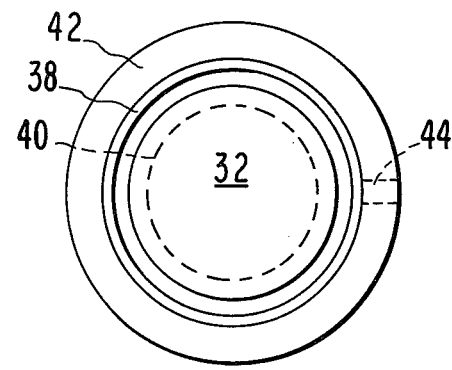

TUNING APPARATUS FOR AN OPTICAL OSCILLATOR

This patent application is a continuation-in-part of patent application Ser. No. 365,317 filed May 30, 1973 now U.S. Pat. No. 3,868,592 and assigned to the same assignee.

BACKGROUND OF THE INVENTION

The present invention relates to optical oscillators and, in particular, to improved means to either narrow the bandwidth of the optical oscillator or to tune the output of an optical oscillator, such as a dye laser.

Dye lasers have attracted much attention recently because of their property of being able to provide output wavelengths continuously tunable over comparatively large segments of the visible spectrum. In contrast, other lasers are only capable of providing strong output wavelengths at a limited number of discrete wavelengths.

In order to vary the output wavelength of a dye laser, suitable tuning apparatus must be provided. Presently, tuning is accomplished in a number of ways. One way is to place a prism within the optical cavity of the dye laser. As is well known, the prism refracts different wavelengths of light which pass through it at different angles. For laser oscillation to be maintained between the mirrors forming the optical resonator, the mirrors must be perfectly aligned so that reflected light is perpendicular to the surfaces of the optical resonator mirrors. Thus, by pivoting one of the optical resonator mirrors of the dye laser relative to the light passing through the prism, it is possible to allow laser oscillation only in a limited part of the spectrum.

Unfortunately, this technique has several major disadvantages. First, to obtain narrow linewidths, the resonator must be constructed so that it is extremely sensitive to angular misalignment, since the prism controls wavelength by angular dispersion. Second, angular misalignments between the pump laser and the dye laser result in variations in the dye laser output wavelength. Third, complicated means must be provided to insure that the position and direction of the output beam do not vary as the wavelength is varied. Fourth, to obtain narrow linewidths by using a prism, high dispersion glasses must be used, and these glasses introduce unwanted losses into the optical cavity and also exhibit thermal focusing which effectively changes the stability characteristics of the laser resonator.

A second approach to tuning a dye laser is the utilization of an adjustable optical grating within the optical resonator of the dye laser. By pivoting or rotating the grating, a desired output wavelength can be selected. This approach has the serious limitation of high optical losses.

A third approach includes the use of a lens having a relatively large longitudinal chromatic aberration at the output end of the dye laser. The wavelength of the light reflected from the output mirror and focused by the lens at the dye cell depends, because of the aberration, on the spacing of the lens away from the cell, and motion of the lens toward and away from the cell thus changes the wavelength of the light emitted by the laser. See, for example, U.S. Pat. No. 3,707,687. This arrangement also has disadvantages, mainly relatively poor wavelength control resulting in large bandwidths.

It is, therefore, an object of the invention to provide an improved technique for either narrowing the bandwidth of, or tuning, an optical oscillator.

Another object of the present invention is to provide an improved tuning apparatus for a dye laser.

Another object of the invention is to provide a tuning device for a dye laser which is capable of providing narrow bandwidth output from a dye laser over a broad range of the dye laser spectrum.

Another object of the invention is to provide an improved tuning means for a dye laser which is not overly sensitive and yet which is easy to construct and maintain in alignment.

In accordance with the present invention, a birefringent plate is placed within the optical cavity of an optical oscillator, such as a dye laser, at Brewster's angle to the light reflected therein. To alter the output wavelength of the optical oscillator, i.e. to tune or narrow its bandwidth, the birefringent plate is rotated about an axis which maintains the birefringent plate at Brewster's angle.

In accordance with another aspect of the invention, additional birefringent plates can be provided to further narrow the linewidth from the output of optical oscillator. Each of these additional birefringent plates is also positioned so that each is at Brewster's angle to the resonant optical mode within the optical cavity. As will be explained, the thickness of the birefringent plates must be related such that the thicker plates are an integral multiple of the thickness of the thinnest birefringent plate.

BRIEF DESCRIPTION OF THE DRAWINGS

FIG. 5 is a graphical illustration of the output characteristics of a dye laser utilizing the improved tuning mechanism of the present invention.

FIGS. 6A, 6B and 6C are graphical illustrations relating to another embodiment of the present invention.

FIGS. 7A and 7B illustrate another embodiment of the present invention.

DESCRIPTION OF THE PREFERRED EMBODIMENT

Figure 1:
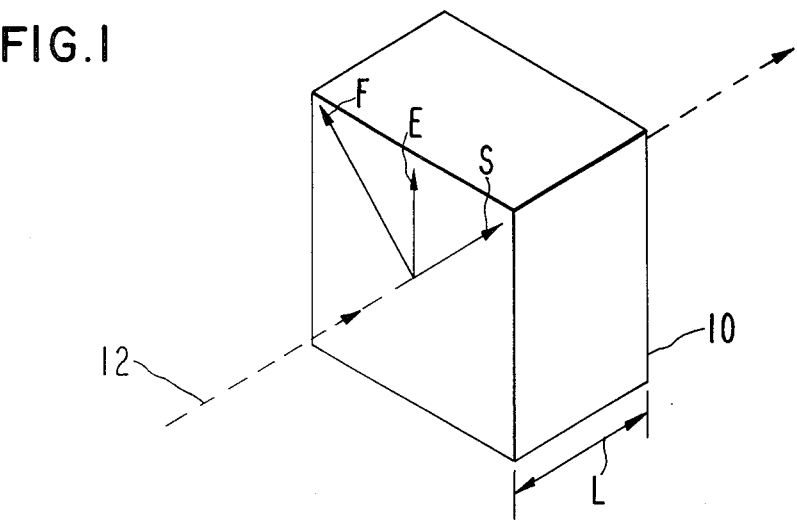
FIG. 1 is a prospective view of a birefringent plate.

Referring to FIG. 1, F and S denote the fast and slow axes of a birefringent crystal 10. These axes are also referred to as the "ordinary" and "extraordinary" axes, respectively. Let $n_F$ or $n_o$ denote the index of refraction for light polarized along the F axis and $n_S$ or $n_e$ denote the index of refraction for the S axis polarization. In a birefringent crystal, these are not equal, i.e. $n_F \neq n_S$.

The E vector of an incident light beam 12 can be resolved into components along these two axes. These components then propagate through the crystal at different velocities, $c/n_F$ and $c/n_S$ where c equals the velocity of light in a vacuum. The total number of optical waves at wavelength $\lambda$ in transversing the crystal along the two axes are:

Number of waves along $F = (L \cdot n_F)/\lambda$     Equation I

Number of waves along $S = (L \cdot n_S)/\lambda$  Equation II

In general, then, there will be a net phase shift between the two components. The number of waves phase shift, N, assuming that $n_S > n_F$, is given by:

$N = l/\lambda (n_S - n_F)$  Equation III

Note that if N is some integer, then, since the light is periodic, the two components will recombine to give an output polarized like, i.e. parallel to, the input light E vector for a given thickness L. If N is not an integer, the output beam will be in general elliptically polarized. If there is a 180° phase shift, the polarization is rotated 90° spatially.

Suppose now a polarizer is placed after the crystal aligned parallel with the polarization of an input beam of light 12, and suppose N in Equation III is an integer at some wavelength. If the wavelength of the incident beam 12 is now varied, there will be more or less phase shift between the F and S components, and the output becomes elliptically polarized. Only the component parallel to the polarizer is now passed. At some new wavelength, the phase shift will have changed by a full wave, again giving 100% transmission.

Peak transmission wavelengths are related by:

$$\frac{LB}{\lambda 1} - \frac{LB}{\lambda 2} = 1 \text{ where } B = N_S - N_F \quad \text{Equation IV}$$

Figure 2:
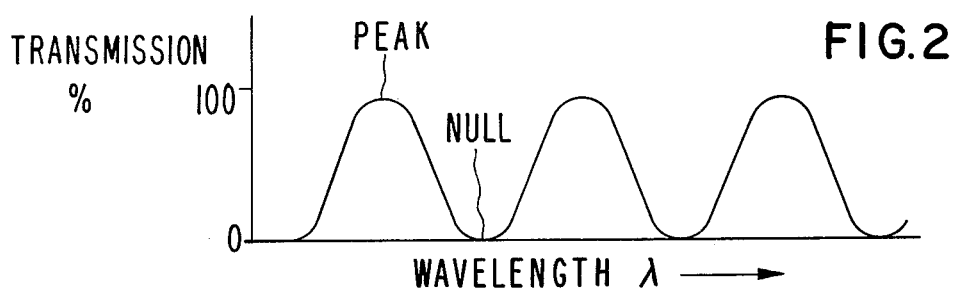
FIG. 2 is a graphical illustration of the transmission properties of a birefringent crystal in combination with two polarizers.

FIG. 2 illustrates the transmission through the crystal/polarizer combination as a function of wavelength. The nulls go all the way to zero if the angle between the E vector and the F axis (or slow axis) is 45°. For other angles, the transmission does not go all the way to 0%.

Figure 3:
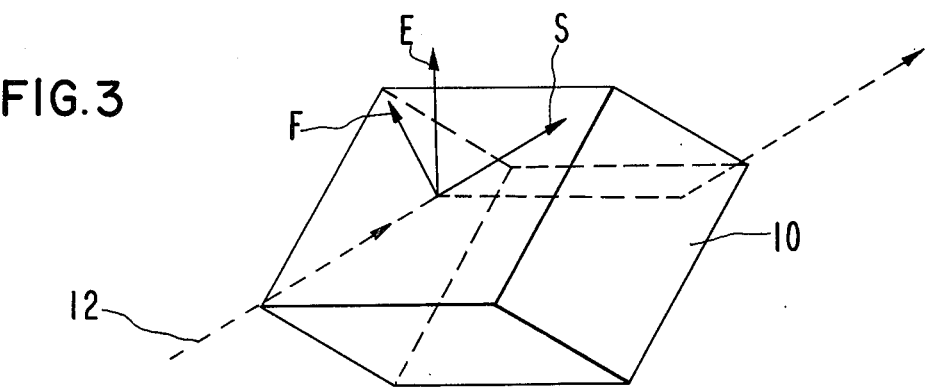
FIG. 3 is a perspective view of a birefringent plate inclined at Brewster's angle to an incoming beam of light.

Rather than using a polarizer, if the birefringent plate is tipped to Brewster's angle ($\theta_B$) relative to the incident beam 12 as shown in FIG. 3, the reflection from the interface is used to reduce the transmission of wavelengths which do not see an integral number of waves phase shift. Brewster's angle is given by the equation:

$\theta_B = \tan^{-1} (n_2/n_1)$  Equation V where $n_1$ and $n_2$ are respectively the indices of refraction of the atmosphere in which the birefringent plate is placed, and the birefringent plate itself. Thus, the use of a separate polarizer is eliminated by placing the plate 10 at Brewster's angle to the incident beam 12. The nulls do not go all the way to 0% but otherwise the behavior is similiar.

Figure 4:
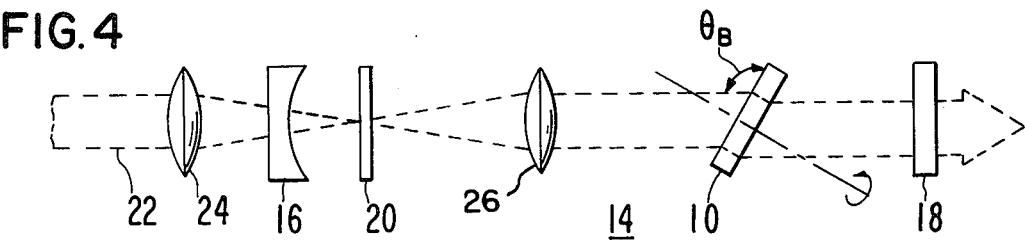
FIG. 4 is a diagrammatic illustration of a dye laser incorporating the improved tuning apparatus of the present invention.

Referring now to FIG. 4, the birefringent plate 10 is placed within the optical cavity of an optical oscillator, in this case a dye laser 14. The optical cavity includes a pair of reflectors or mirrors 16 and 18. Mirror 18 is partially transmissive and serves as the output of dye laser 14. Plate 10 is at Brewster's angle to light reflected between mirrors 16 and 18.

A suitable dye laser 20 is also provided within the optical cavity of the dye laser 14. Dye 20 is excited or "pumped" optically by means of a pump beam 22 which is typically provided by another laser, such as a gaseous ion laser, in a manner wellknown to those skilled in the art. The pump beam 22 is focused by means of a lens 24. Reflector 16 is designed to allow light from the pumping source through it so that it impinges upon the dye cell, while at the same time reflecting substantially all of the light generated within the dye laser 10.

Lens 26 provides a small focused beam at the dye cell while maintaining a collimated beam through the birefringent plate 10.

The birefringent plate 10 inserted within the optical cavity of dye laser 10, acts as a wavelength selector, selecting those wavelengths which encounter no loss going through the plate 10, i.e. an integral number of wave phase shifts. The Brewster angle reflection is negligible.

The thickness of plate 10 is selected so that the spacing between peaks exceeds the width of the dye laser 14 gain curve. This is illustrated in FIG. 5. Note that the nulls do not go to zero, but for dye laser tuning it is not necessary that they do so, but only that a sufficient loss is presented to the dye laser.

In accordance with the present invention, the dye laser 14 is tuned, i.e. the output wavelength is selected, by rotating the birefringent plate 10 while maintaining it at Brewster's angle to the light reflected between the optical resonator mirrors.

The index of refraction $n_F$ is frequently referred to as the "ordinary index of refraction" ($n_o$) and refraction index $n_S$ as the "extraordinary index of refraction" ($n_e$) as stated previously. Because the birefringent plate is aligned so that the direction of propagation of the light through it is not along the ordinary or extraordinary axes, the incoming light can always be resolved into two orthogonal components, an "ordinary" ray and an "extraordinary" ray.

As the birefringent plate 10 is rotated, the effective extraordinary index of refraction, $n_e$, changes, while the ordinary index, $n_o$, does not, i.e. the speed of propagation of one component changes with rotation. Hence, there will always be some wavelength at a given angular orientation of the birefringent plate which will be transmitted through the plate. As the birefringent plate is rotated, this wavelength changes, making it possible to "tune" the dye laser 12.

As described with reference to FIG. 5, by adjusting the thickness of the birefringent tuning plate, the spacing between the transmission "peaks" can be made to exceed the dye laser gain curve. In order to narrow the output bandwidth still further, additional birefringent plates can be provided where each such plate is some integral number of times thicker than the thinnest plate, and where each is maintained at Brewster's angle to the light.

This is illustrated in FIGS. 6A, 6B and 6C. FIG. 6A shows the nulls and peaks for a birefringent tuning plate having a thickness $L_1$. FIG. 6B shows the nulls and peaks for a birefringent tuning plate having a thickness $2L_1$. Where the two tuning plates are provided within the cavity of a dye laser, each at Brewster's angle to the light reflected within the optical cavity of the dye laser, the resulting peaks are narrower and spread further apart than the case for either birefringent plate individually, as illustrated in FIG. 6C.

A dye laser tuning assembly 30, comprising three birefringent plates 32, 34 and 36 is shown in FIGS. 7A and 7B. Tuning assembly 30 can be used to replace the single birefringent plate 10 in FIG. 4. Each of the plates 32, 34 and 36 are mounted to cup-shaped holders 38 by suitable means such as epoxy. Each of the cup-shaped members 38 has a central aperture 40 which has a slightly smaller diameter than the diameter of the birefringent plates to allow the passage of light to adjacent birefringent plates and to the optical resonator.

The cup-shaped members 38 are stacked upon each other within a cylindrical envelope 42. In this manner, the birefringent plates are spaced apart and parallel to each other. Thus, by mounting the tuning assembly 30 so that one of the plates is at Brewster's angle, $\theta_B$, to the light reflected within the optical resonator of the dye laser, the other birefringent plates will also be oriented at Brewster's angle to the light. As explained previously, the entire assembly 30 is then rotated to provide the desired output wavelength.

For the proper operation of the tuning assembly 30, the respective extraordinary and ordinary axes of the birefringent plates 32, 34 and 36 must be aligned. This insures that the peaks through the respective birefringent plates will be aligned when they are supposed to be.

Three set screws 44 extending through the envelope 42 are provided to engage the cup-shaped holder members 38 to lock the birefringent plates when the axes are in the desired orientation. There are a number of ways which would be apparent to one skilled in the art to align these axes of the birefringent plates 32, 34 and 36. For example, one way is to first place the member 38 holding the birefringent plate 36 into the envelope 42, securing it by tightening the set screw 44. A laser beam is then directed through the plate 36 and the wavelength of the beam is measured by a monochromator after it passes through plate 26. The second birefringent plate 34 is then placed within the envelope 42 and is rotated until the same laser beam directed through both birefringent plates 36 and 34 reads the same wavelength as the monochromator. At this point, the set screw is tightened to lock the birefringent plate 34 in place. A similar operation is then performed with respect to the birefringent plate 32.

In one actual embodiment of the tuning assembly 30, the birefringent plates are made of crystal quartz with plate 36 being 0.013 inch thick, birefringent plate 34 being four times the thickness of plate 36 or 0.052 inch, and plate 32 being sixteen times the thickness of plate 36 or 0.208 inch. In the case of quartz crystal, at 5080 A, the ordinary index of refraction is 1.54822 and extraordinary index is 1.55746. Thus, the value of B is equal to $M_e - M_o = 0.009$.

Tuning assembly 30 with the aforedescribed birefringent plates has been found to be capable of providing an 0.3 A linewidth output in a Rhodamine 6G day laser over a range of 5700 A to 6400 A. Utilizing a 2.5 watt argon ion laser as the pumping source, operating on all lines, the dye laser provided 500 milliwatts output.

Using other dyes such as Rhodamine B, sodium fluoroscein, cresyl-violet, and Rhodamine 110, and the same tuning mechanism 30, continuous tuning from 5270 A to 6997 A has been provided with an output linewidth of less than 0.5 A.

Placing the birefringent plate at Brewster's angle provides the lowest optical loss within the laser resonator and prevents interference between beams reflected from the two surfaces of "etalonning". However, different spectral characteristics of the output radiation can be obtained by placing the plate at other angles or even at normal incidence. It has been found, for example, that placing the plate so that there is reflection from the surfaces causes the plate to function both as a birefringent filter and an etalon. This can provide even further wavelength narrowing.

It has also been discovered, with the aid of computer analysis, that the tuning plates in the described configuration provide a narrower bandwidth than is obtained with plates between perfect polarizers.

The aforedescribed improved tuning means is capable of providing continuous tuning in a dye laser with very narrow linewidth output. Further, wavelength adjustments can be made without the adverse effects of extremely fine sensitivity. Further, the mechanism is simple in construction and comparatively inexpensive to design and build.

Further, the tuning mechanism allows the laser resonator to be constructed so as to operate in a stable configuration with attendant higher efficiency and more stable output. The tuning mechanism maintains the same output wavelength in spite of resonator misalignments or misalignments between the dye laser and the pump laser. Further, the tuning mechanism has very low losses, thus permitting low gain dyes to be used.

The improved means of the present invention has application, in addition to tuning a dye laser, to other optical oscillators. By optical oscillator, it is meant a device having an optical resonator or other means for providing feedback and having an element within the resonator which results in a new gain at optical frequencies. Thus, the present invention can be used to either tune optical oscillators, other than dye lasers, or to narrow the output bandwidth of optical oscillators.

The present invention, for example, could be used to tune conventional lasers. Many lasers simultaneously emit light at a few or many discrete frequencies. The tuning assembly of the present invention could be used within the laser optical cavity to select a particular wavelength. Gaseous ion lasers are one example where this can be done.

As the gas pressure of a $CO_2$ laser is increased, discrete output wavelengths begin to spread out and eventually "fuse" so that a continuous output is provided over a limited bandwidth. The present invention can be used to selectively tune a $CO_2$ laser operated in this mode to a desired, discrete wavelength.

An optical parametric oscillator is an example of an optical oscillator in which the present invention is applicable to narrow the output bandwidth. An optical parametric oscillator converts an optical signal at one frequency into resultant optical signals of several frequencies. Unlike a laser, however, an optical parametric oscillator does not operate on the principle of stimulated emission. The resultant optical signals can be reduced in bandwidth by the use of the present invention.

What is claimed is:

1. A method of tuning or narrowing the output of an optical oscillator comprising:
    placing a birefringent plate having an ordinary and an extraordinary index of refraction within the optical cavity of the optical oscillator at Brewster's angle with respect to light reflected within the optical cavity thereof; and
    rotating said plate to effectively change the extraordinary index of refraction of said birefringent plate while the ordinary index of refraction thereof remains the same to obtain the desired output wavelength, while maintaining said birefringent plate at the same angle with respect to the reflected light.

2. The method of claim 1 including the steps of placing additional spaced-apart ganged birefringent plates within the optical cavity of the optical oscillator, each at Brewster's angle relative to the light reflected within the optical cavity and the thickness of the plates being related such that the thicker plates are an integral multiple of the thickness of the thinnest plates.

3. In an optical oscillator having an optical cavity, apparatus for tuning or narrowing the bandwidth thereof comprising:
a birefringent plate having an ordinary and an extraordinary index of refraction;
said birefringent plate being mounted within the optical cavity of the optical oscillator at Brewster's angle with respect to light reflected within the optical cavity thereof; and
means for rotating said birefringent plate to effectively change the extraordinary index of refraction of said birefringent plate while the ordinary index of refraction thereof remains the same to provide the desired output wavelength of said light beam, said plate being maintained at the same angle with respect to the reflected light beam.

4. Apparatus as in claim 3 wherein said birefringent plate is made of quartz crystal.

5. Apparatus for tuning or narrowing the bandwidth of an optical oscillator comprising:
a plurality of spaced-apart parallel birefringent plates wherein each of said plurality of plates has a different thickness and wherein the thickness of the thicker plates is an integer multiple of the thickness of the thinnest plate;
said plurality of birefringent plates being mounted within the optical cavity of the optical oscillator at Brewster's angle with respect to light reflected within the optical cavity thereof; and
means for rotating said plurality of birefringent plates to provide the desired output wavelengths, said plurality of plates being maintained at Brewster's angle.

6. Apparatus as in claim 5 wherein said plurality of plates are made of quartz crystal.

* * * * *

UNITED STATES PATENT OFFICE
CERTIFICATE OF CORRECTION

PATENT NO. : 3,934,210
DATED : January 20, 1976
INVENTOR(S) : J. Michael Yarborough et al It is certified that error appears in the above-identified patent and that said Letters Patent are hereby corrected as shown below:

Column 1, line 63, delete "away".

Column 2, before line 1, insert the heading --SUMMARY OF THE INVENTION--.

Column 2, line 60, delete "$n_F \quad n_S$" and insert --$n_F \neq n_S$--.

Signed and Sealed this

Third Day of August 1976

[SEAL]

Attest:

RUTH C. MASON
*Attesting Officer*

C. MARSHALL DANN
*Commissioner of Patents and Trademarks*